United States Patent
Cox et al.

(10) Patent No.: US 7,001,081 B2
(45) Date of Patent: Feb. 21, 2006

(54) STRAIN RELIEF BOOT WITH FLEXIBLE EXTENSION FOR GUIDING FIBER OPTIC CABLE

(75) Inventors: Larry R. Cox, Austin, TX (US); Harry A. Loder, Austin, TX (US); Edward B. Lurie, Round Rock, TX (US); Mark D. Matthies, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/444,122

(22) Filed: May 22, 2003

(65) Prior Publication Data

US 2004/0234209 A1     Nov. 25, 2004

(51) Int. Cl.
G02B 6/36     (2006.01)

(52) U.S. Cl. .................................................. 385/86
(58) Field of Classification Search ............ 385/86–87, 385/134–136, 76, 53, 56; 439/523, 449, 439/470, 456
See application file for complete search history.

(56) References Cited

U.S. PATENT DOCUMENTS

| | | |
|---|---|---|
| 5,170,452 A | 12/1992 | Ott |
| 5,329,603 A | 7/1994 | Watanabe et al. |
| 5,390,272 A | 2/1995 | Repta |
| 5,461,690 A | 10/1995 | Lampert |
| 5,473,723 A | 12/1995 | Stockman |
| 5,781,681 A | 7/1998 | Manning |
| 6,134,370 A | 10/2000 | Childers |
| 6,374,022 B1 | 4/2002 | Parmigiani et al. |
| 6,482,017 B1 | 11/2002 | Van Doorn |
| 6,554,489 B1 | 4/2003 | Kent |
| 2002/0012504 A1 | 1/2002 | Gillham |

FOREIGN PATENT DOCUMENTS

| | | |
|---|---|---|
| EP | 0 533 496 A1 | 3/1993 |
| EP | 0 997 756 A2 | 5/2000 |
| WO | WO 03/021307 A2 | 3/2003 |

OTHER PUBLICATIONS

US CONEC®; Concours NP™ (Non-Planar) Optical Circuits; Product Literature; © 2002 US Conec Ltd.; US Conec Ltd., Hickory NC, USA; 2pp.
3M Interconnect Solutions; Multi-Fiber Cable Assembly; Product Literature; Nov. 21, 2002; Austin, TX; 4 pp.
International Search Report for PCT/US2004/012269.

*Primary Examiner*—Javaid H. Nasri
(74) *Attorney, Agent, or Firm*—Melanie G. Gover

(57) ABSTRACT

The present invention relates to a fiber optic cable assembly including a connector subassembly having a fiber optic cable terminated in a connector, the fiber optic cable having a minimum bend radius; and a strain relief boot attached to the connector subassembly, the strain relief boot having a core portion, a flexible extension with a proximal end and a distal end, the proximal end extending from the core portion. The flexible extension retains at least a portion of the fiber optic cable.

37 Claims, 3 Drawing Sheets

STRAIN RELIEF BOOT WITH FLEXIBLE EXTENSION FOR GUIDING FIBER OPTIC CABLE

FIELD OF INVENTION

The present invention relates to a strain relief boot for use with a connector subassembly to yield a fiber optic cable assembly. In particular, the present invention relates to a strain relief boot that allows for routing, bending, and flexing of the fiber optic cable used in the cable assembly while helping to minimize the possibility that such routing, bending or flexing will violate the minimum bend radius of the fiber optic cable.

BACKGROUND

One skilled in the art recognizes that in fiber optic cable applications, care is taken not to violate the minimum bend radius of the cable, i.e., the radius at which bends in the cable should not be exceeded. For example, a fiber optic cable that uses a typical 125 micrometer diameter glass/glass fiber has a minimum bend radius of about 2.5 to 3.0 cm (about 1 inch). It is known that bends can increase attenuation because bends in the optical fiber change the angles of incidence and reflection. Bends can decrease the mechanical strength, i.e., the tensile strength of the fiber. Bends also cause cracks in the optical fiber thereby decreasing its life and the life of the fiber optic cable. Thus, a fiber optic cable manufacturer usually publishes the minimum bend radius of its fiber optic cables.

Fiber optic cables are used in many applications that require routing the cables in a desired direction. For example, a fiber optic cable terminated in a cabinet can be required to bend through an arc of about ninety degrees shortly after the termination point. Thus, as one skilled in the art will recognize, care should be given to the cable routing, bending, or flexing at that point to minimize the possibility that such routing will violate the minimum bend radius of the cable.

There exists a need for devices that can aid the routing, bending, and flexing of a fiber optic cable while simultaneously trying to minimize the possibility that such routing, bending, and flexing will violate the minimum bend radius of the fiber optic cable.

SUMMARY

In one aspect, the present invention provides for a fiber optic cable assembly comprising (a) a connector subassembly comprising a fiber optic cable terminated in a connector, the fiber optic cable having a minimum bend radius; and (b) a strain relief boot attached to the connector subassembly, the strain relief boot comprising a core portion; a flexible extension having a proximal end and a distal end, the proximal end extending from the core portion, and a means for retaining at least a portion of the fiber optic cable which is disposed along the flexible extension. The flexible extension does not have a predetermined bend.

In another aspect of the invention, the flexible extension is a tapered beam having a varying cross-sectional area such that the height of the beam at its proximal end is about twice the height of the beam at its distal end. The tapered beam at the distal end does not come to a sharp point.

As further described herein, the flexible extension on the strain relief boot does not have a predetermined curve or path to it. That is, the flexible extension, in its original position, is substantially straight and not initially curved. When a user applies a force to the fiber optic cable, the flexible extension will respond to that particular amount of stress by bending and flexing. The more force applied to the fiber optic cable, the more the flexible extension will bend, and it will bend at a substantially constant radius of curvature. If the stress on the fiber optic cable is completely relieved, the flexible extension will likely follow the relaxed state of the fiber optic cable.

The above summary of the present invention is not intended to describe each disclosed embodiment or every implementation of the present invention. The figures and detailed description that follow below more particularly exemplify illustrative embodiments. Also, all numbers used herein are assumed to be modified by the term "about".

BRIEF DESCRIPTION OF THE DRAWINGS

The invention can be further described with the figures below. Like reference numbers represent similar items.

Figure 1:
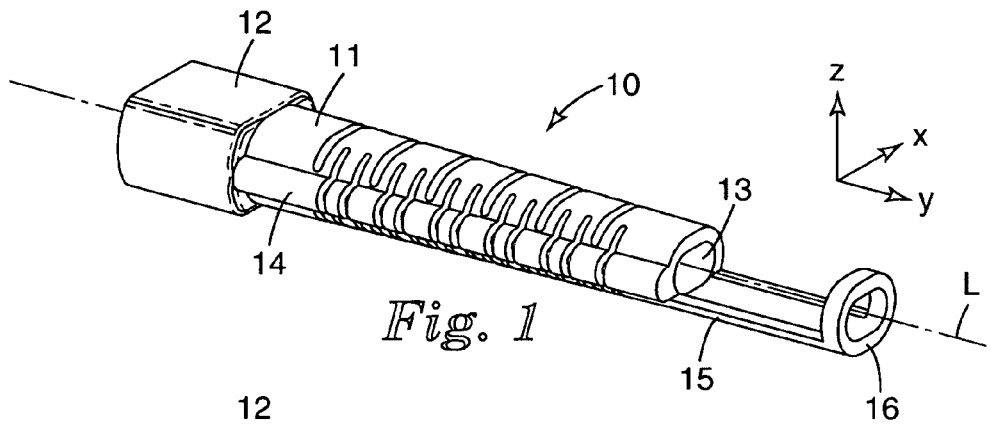
FIGS. 1 to 5 are perspective views of various exemplary embodiments of repositionable strain relief boots in accordance with various aspects of the present invention.

These figures are idealized, not drawn to scale, and are intended only for illustrative purposes.

DETAILED DESCRIPTION

An advantage of one exemplary embodiment of the present invention is that one can bend and flex the fiber optic cable used in a fiber optic cable assembly so as to direct it in a desired direction. In particular, through the use of a flexible extension on the strain relief boot, the fiber optic cable can bend at a constant radius of curvature, desirably at a radius that is greater than the minimum bend radius of the cable. The flexible extension also aids in relieving the stress that would be imposed on the fiber optic cable as it exits the core portion of the strain relief boot by providing a zone where the fiber optic cable can transition out of the strain relief boot. In other words, without the flexible extension, the fiber optic cable can bend at nearly a 90° angle as it exits the strain relief boot, which in most cases would exceed the minimum bend radius of the cable and damage the optical fibers therein.

Another advantage of one exemplary embodiment of the present invention is that the flexible extension is designed, through materials selection and through the dimensions, to have a flexural characteristic that coincides with the flexural characteristic of the fiber optic cable used. The term "flexural characteristic" means the deflection characteristic of a specified length of material. One can determine the flexural characteristic in various ways, and a useful way is described as follows. One can take a 5.08 cm (2 inches) length of a fiber optic cable, place it horizontally and secure one end, apply a known load (e.g., 1 lb or 0.454 kg) at room temperature (23° C.) on the free end of the cable and measure the vertical downward deflection of the cable at the free end. From this test, one can have an understanding of how much bending or flexing a known length of fiber optic cable exhibits under a specified load so as to design an approximate flexible extension. If the flexural characteristic of the flexible extension is too high, e.g., 50% higher than that of the cable, the flexible extension would likely be too stiff and when one tries to apply a stress to the fiber optic cable assembly, the flexible extension would likely provide little to no transition for the cable. Thus, the bent cable will most likely exceed the maximum bend radius, possibly causing a kink and damaging the optical fibers therein. If the flexural characteristic of the flexible extension is too low, e.g., 50% lower than that of the cable, the flexible extension would likely be too soft thereby providing no support to the cable when a stress is applied to it. The term "coincide" means generally that the flexural characteristic of the fiber optic cable used in the fiber optic cable assembly is similar to but does not have to be exactly the same as the flexural characteristic of the flexible extension.

The strain relief boot can be repositionable or non-repositionable. As used herein, the term "repositionable strain relief boot" means generally that it can be bent or flexed multiple times from its original position, which is typically substantially straight, to a second position and then back to its original position. A flexible strain relief boot is one that can be bent or flexed multiple times from its original position and is considered to be a repositionable boot. In one exemplary embodiment after bending or flexing, the repositionable strain relief boot will remain in its bent position so as to direct the fiber optic cable used therein in a desired direction. The term "non-repositionable strain relief boot" means the strain relief boot has a predetermined path, e.g., it can be curved or it can be substantially straight, and it is not intended for one to substantially change that predetermined path.

FIGS. 1 to 5 represent perspective views of various exemplary embodiments of the repositionable strain relief boot. Turning to FIG. 1, repositionable strain relief boot 10 has core portion 11 and connector mating end 12, which is the end that will be attached to some connector subassembly designs to yield a fiber optic cable assembly. Channel 13 runs through the core portion and the connector mating end. A fiber optic cable (not shown) resides in channel 13. In this particular embodiment, the channel is tapered, where the channel is the widest near the connector mating end. Rib 14 extends from the strain relief boot, and as shown here, from the core portion of the strain relief boot. The rib could, however, extend from the connector mating end portion of the strain relief boot as well. More than one rib can be used on the core portion and/or on the connector mating end portion of the strain relief boot. In one exemplary embodiment, the rib is formed integrally with the strain relief boot, e.g., the rib and strain relief boot are molded in place. A wire (See FIG. 5, wire 52) is disposed in the rib. In one exemplary embodiment, the wire is molded in place in the rib so it is locked in the rib. The wire bends and flexes as the strain relief boot bends and flexes. And, because the wire is molded in place with the rib, it will not likely break out of the rib unless too much force is applied to the strain relief boot during the bending and flexing process. The strain relief boot has a longitudinal axis, generally denoted as "L" that lies along the longitudinal centerline of the strain relief boot. For reference purposes, a Cartesian coordinate system having x, y, and z axes is shown in FIG. 1, where the x-axis represents the width of the strain relief boot or the width of the flexible extension, the y-axis represents the length of the strain relief boot or the length of the flexible extension, and the z-axis represents the height of the strain relief boot or the thickness of the flexible extension.

A plurality of slits or gaps is disposed on the core portion of the strain relief boot. The slits in the core portion and on the ribs lie generally perpendicular to the longitudinal axis L. While the slits aid in the bending and the flexing of the strain relief boot, they also act as bend limiting features. When one bends the strain relief boot in an arc, i.e., away from its original position, the slits on one side of the core portion tend to expand, while the slits on the opposite side of the core portion tend to close. The side of the core portion that has the longest distance to travel will see an expansion of the slit or gap opening. The amount of slit expansion or contraction is one determination of the amount of bending the strain relief boot experiences. As one skilled in the art will recognize, when the strain relief boot is bent at angles of 10° and 45° away from its longitudinal axis in the negative z direction (downwards), the slits disposed on the topside of the strain relief boot will expand more at the 45° angle than at the 10° angle. And, the slits on the bottom side of the strain relief boot will contract more at the 45° angle than at the 10° angle. It should be noted that the repositionable strain relief boot described in FIGS. 1 to 5 could have some degree of bending in all three dimensions. For example, it is possible to twist the strain relief boot.

Continuing with FIG. 1, flexible extension 15 has a proximal end and a distal end, the proximal end extends from the core portion of the strain relief boot. Thus, the proximal end of the flexible extension is situated close to or nearest the core portion and the distal end is situated farthest away from the core portion. Also because the flexible extension "extends from" the core portion, it does not actually lie within any part of the core portion. At least a portion of the fiber optic cable is disposed on the flexible extension. In one exemplary embodiment, means for retaining the fiber optic cable is disposed on the distal end of the flexible extension. A plurality of means for retaining the fiber optic cable can reside at any distance along the flexible extension. In the exemplary embodiment of FIG. 1, the means for retaining the fiber optic cable is a closed loop 16. Although flexible extension shown in FIG. 1 lies horizontal to the page thus allowing for bending and flexing of the fiber optic cable in both the positive and negative z directions, it is within the scope of the present invention to have the flexible extension disposed vertical to the page thereby allowing for bending and flexing of the fiber optic cable in the positive or negative x direction.

The flexible extension can generally be described as a beam having a varying cross-sectional area. In one exemplary embodiment, the flexible extension is a tapered beam. A tapered beam provides the advantage that when an injection molded process is used to make the flexible extension, it will be easier to remove a tapered beam from the mold than to remove a beam of substantially constant cross-section. In another exemplary embodiment, the flexible extension is a cantilevered tapered beam. In order for the beam to bend at a substantially constant radius of curvature, the stress imposed along the y dimension or the length of the beam should be substantially constant. To simplify the mathematical relationships between the dimensions of the flexible extension and the materials property of the flexible extension, the thickness of the flexible extension, i.e., the z dimension, at its distal end is chosen to about one half of the thickness of the flexible extension at its proximal end. It should be noted that the dimension of the flexible extension depends upon the properties of the material used for constructing it, such as, e.g., the Young's modulus, and the material properties of the fiber optic cable used. In one exemplary embodiment, the length of the flexible extension is about one third of the total length of the strain relief boot. In another exemplary embodiment, the length of the flexible extension was chosen to be 2.54 cm (1 in.), which is approximately the length of an arc subtending an angle of 45° for a 2.54 cm (1 in.) radius. One skilled in the art will recognize that the length of the flexible extension could be more than or less than 2.54 cm, depending on the fiber optic cable application.

There are various methods in determining the flexible extension design and construction. As described above, one exemplary method involves first determining the flexural characteristic of the fiber optic cable. That is, one needs to determine the deflection characteristic, e.g., the deflection length, of a known length of the fiber optic cable under a specified load. For example, if a 5.08 cm (2 in.) cable initially lies horizontally with one end fixed and a load of one pound is applied to the free end of the cable, one can measure the vertical downward deflection of the cable at the free end. The 5.08 cm cable can deflect in an arc such that the vertical deflection distance is 1.27 cm (0.5 inch) under a load of 0.454 kg (1 lb). The load imposed on the free end of the fiber should yield a deflection in the cable that is less than the known minimum bend radius of the cable. The deflection distance of the fiber optic cable should coincide with the deflection distance of the flexible extension. The deflection distance "Y" (in cm or in.) can be described by the following formula: $Y=(PL^3) \div 3EI$, where P=load imposed on the free end of the cable (in lbs or kg), L=length of the beam (in cm or in.), E=Young's modulus i.e., the elastic modulus of the material used for the beam (in N/m² or psi), I=moment of inertia and $$I = \frac{1}{12}(bh^3),$$

where b=width of the beam or the x-dimension (in cm or in.), h=height of the beam or the z-dimension (in cm or in.). One can specify a "b" value and solve the equation for "h", which would be the height of the beam at the proximate end. As stated, the height of the beam at the distal end is chosen to be one half of that of the proximate end. The above stated equation is used merely to approximate the dimensions of the flexible extension. One skilled in the art will recognize that mathematical modeling tools, such as finite element analysis, can be used to help define the dimensions of the flexible extension.

The flexible extensions have the primary function to allow the fiber optic cable to be routed, that is, bent or flexed along a curvature having a constant radius. It has been learned that the addition of the flexible extension extending from the core portion of the body in combination with a means for retaining the fiber optic cable provide a mechanism by which a cable can bend along a constant radius of curvature, preferably at a radius that does not violate the minimum bend radius of the fiber optic cable. The connector mating end of the body is of an appropriate dimension to mate with a conventional fiber optic cable assembly, such as a MPT connector from US Conec, Hickory, N.C. or an Optical Gateway Interface connector from 3M Company, St. Paul, Minn.

Figure 2:
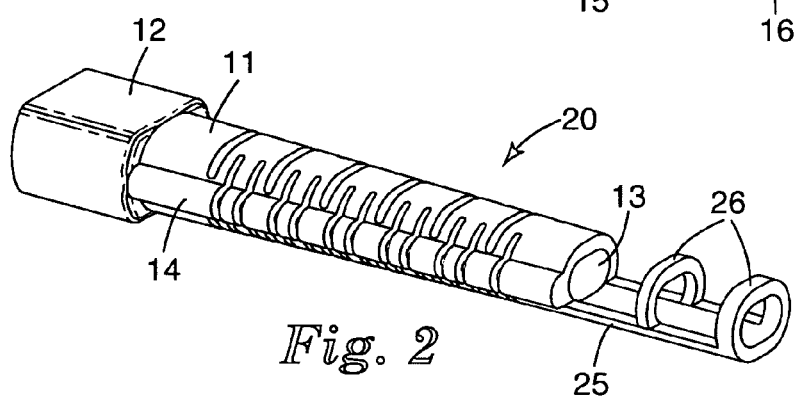

Turning now to FIG. 2, repositionable strain relief boot 20 is similar to that of FIG. 1 except that flexible extension 25, which is integral with the core portion, has two closed loops 26 to function as means for retaining the fiber optic cable.

Figure 3:
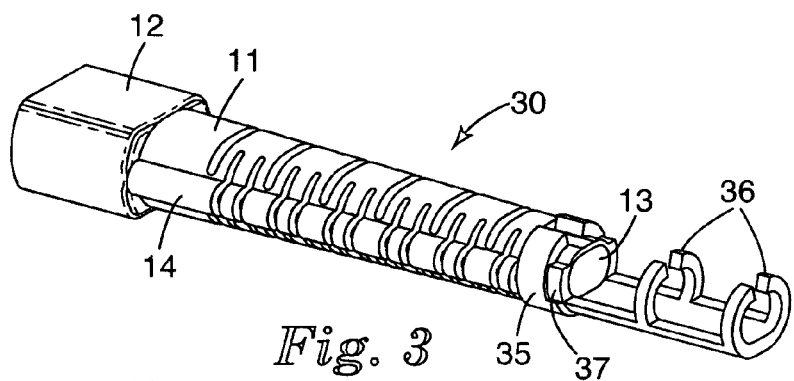

FIG. 3 shows a repositionable strain relief boot 30 where the flexible extension is a separate part that extends from the core portion. The flexible extension has collar 35 that can be attached, e.g., snapped to the core portion. Although FIG. 3 shows an open collar, a closed collar can also be used. The core portion could optionally have retaining features 37 to provide a stop for the collar 35. Alternately, the collar and the core portion could be retained by an interference fit. The flexible extension also has two open loops 36 to function as means for retaining the fiber optic cable. One advantage of this particular embodiment is that the fiber optic cable can be threaded radially through the two open loops.

Figure 4:
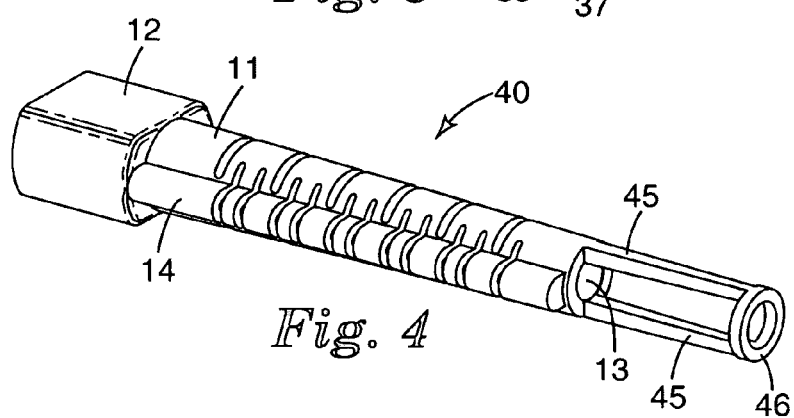

FIG. 4 shows a repositionable strain relief boot 40 having a dual member flexible extension 45 with two beams and closed loop 46. Because the mathematical relationship that describes the moment of inertia "I" for the dual member flexible extension could be rather complex, one could use finite element analysis to determine, through an iterative process, the flexural characteristic of the dual member flexible extension. The defined parameters would be P, L and Y (derived from the flexural characteristic of the fiber optic cable used) and the finite element analysis process could solve for variables such as b, h, as described above as well as "t", the thickness of the loop and "d" the inside and outside diameters of the enclosed loop.

Figure 5:
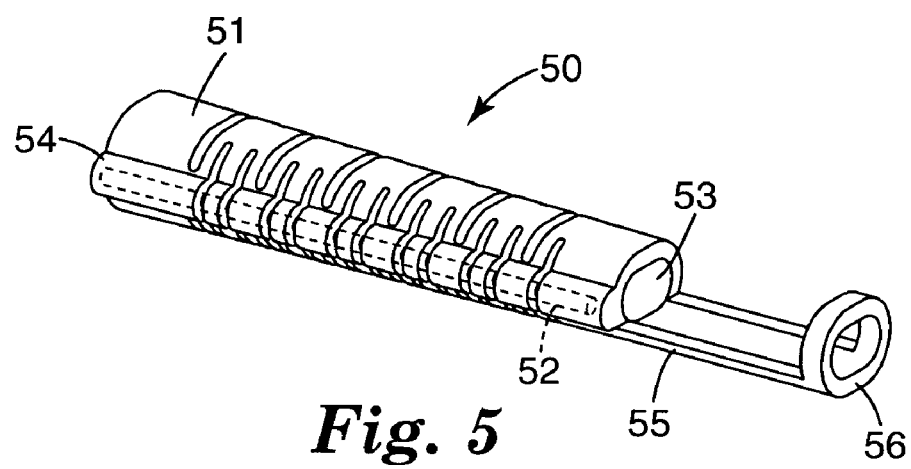
Figure 9:
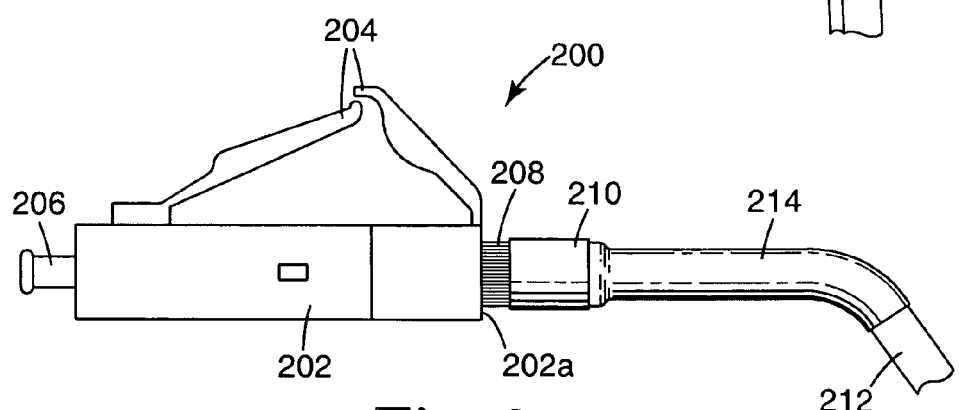
FIG. 9 is a side view of an exemplary connector subassembly that can be used in the present invention.

FIG. 5 shows another exemplary repositionable strain relief boot 50 similar to that in FIG. 1, except that the connector mating end has been removed. This particular embodiment can be used for single fiber optic systems and is particularly suited with the connector subassembly of FIG. 9 to yield a fiber optic cable assembly. The connector subassembly 200 of FIG. 9 contains a housing 202, trigger 204, protective end cap 206 to protect the optical fiber (not shown), strands of fiber, such as KEVLAR fiber, 208 which have been securely held together by metal crimp ring 210. Polymeric protective sheath 214 overlays and protects a portion of the fiber optic cable 212. In use, the core potion of the strain relief boot would be in contact with wall 202a of the connector subassembly and at least a portion of the fiber optic cable 212 would he disposed the flexible extension.

Figure 6:
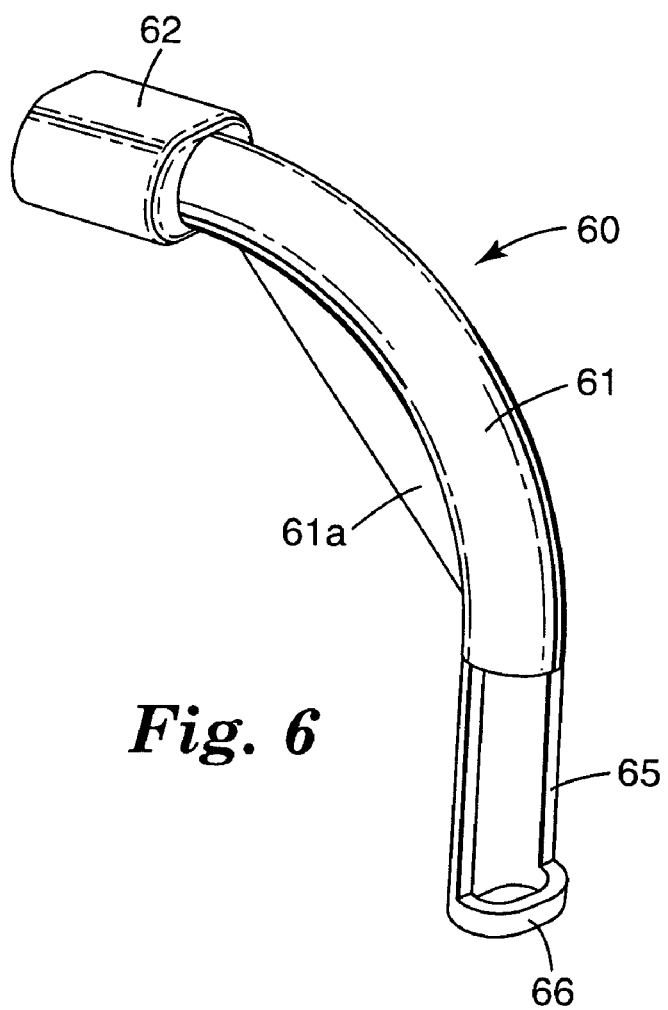
FIG. 6 is a perspective view of an exemplary non-repositionable boot in accordance with another aspect of the present invention.

FIG. 6 shows an exemplary non-repositionable strain relief boot 60 having a core portion 61 containing a predetermined curve, i.e., a preset curvature that will route the fiber optic cable used in substantially a 90° curvature that should be greater than the minimum bend radius of the fiber optic cable used. The core portion can be supported by reinforcing member 61a. The non-repositionable boot further contains connector mating end 62 and flexible extension 65 having means for retaining fiber optic cable 66 that is similar to that of FIG. 1.

One skilled in the art will appreciate that other designs can be used to retain the fiber optic cable. The strain relief boots shown in FIGS. 1 to 5 have a tapered core portion with the first end being larger than the second end. It is within the scope of the present invention, however, to use a non-tapered core portion. The connector mating end is attached to the larger end of the tapered core portion and the flexible extension extends from the opposite, smaller end of the tapered core portion.

As shown and described above in FIGS. 1 to 5, rib 14 resides along the surface of the core portion of the strain relief boot and in these embodiments, the ribs are substantially straight and lie to one side of the strain relief boot. It is within the scope of the present invention to have multiple ribs on the core portion and/or the connector mating end portion of the strain relief boot and the rib(s) do not have to lie along a straight line. For example, the rib could be a spiral one.

The strain relief boot of the present invention can be made from a wide variety of polymers. Suitable polymers include, but are not limited to HYTREL, a tradename for GE Plastics ethylene propylene diene terpolymer. Another suitable polymeric material is polyurethane. The polymeric material used, however, should meet the Underwriter's Laboratory UL-94 V0 flammability requirements.

The flexible extension can be made from a wide variety of metals and polymers. Suitable polymers include, but are not limited to, HYTREL and polyurethane. Again, the polymeric material used should meet the UL-94 VO flammability requirements. Suitable metals would include but are not limited to stainless steel, carbon steel, beryllium copper or phosphor bronze.

The strain relief boot can be manufactured by various techniques. Suitable manufacturing techniques include injection molding or co-injection molding where multiple polymers of different moduli and different flexural characteristics can be used for the flexible extension. One advantage of the co-injection molding would be that it produces a flexible extension having varying elastic moduli and flexural characteristics.

The strain relief boot of the present invention can accommodate any type of fiber optic cable such as single or multifiber cable, which can be supplied in various shapes, such as, e.g., a round cable, an oval cable, or a rectangular cable. As such, FIGS. 1 to 3 show various exemplary embodiments that can accommodate an oval or rectangular cable and FIG. 4 show and exemplary embodiment that can accommodate a round cable.

Figure 7:
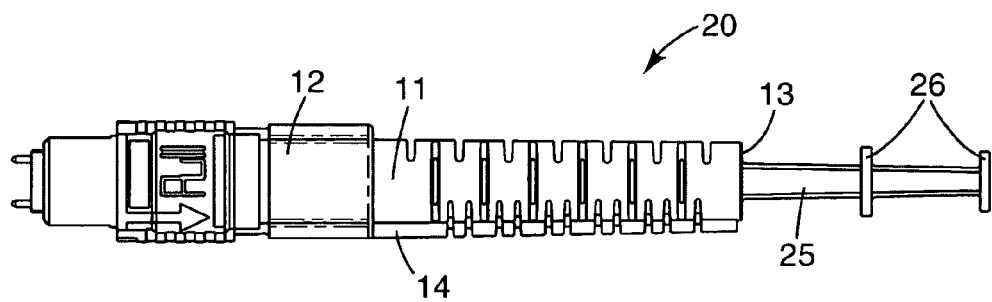
FIG. 7 is a top view of the FIG. 2 embodiment with a connector attached.
Figure 8:
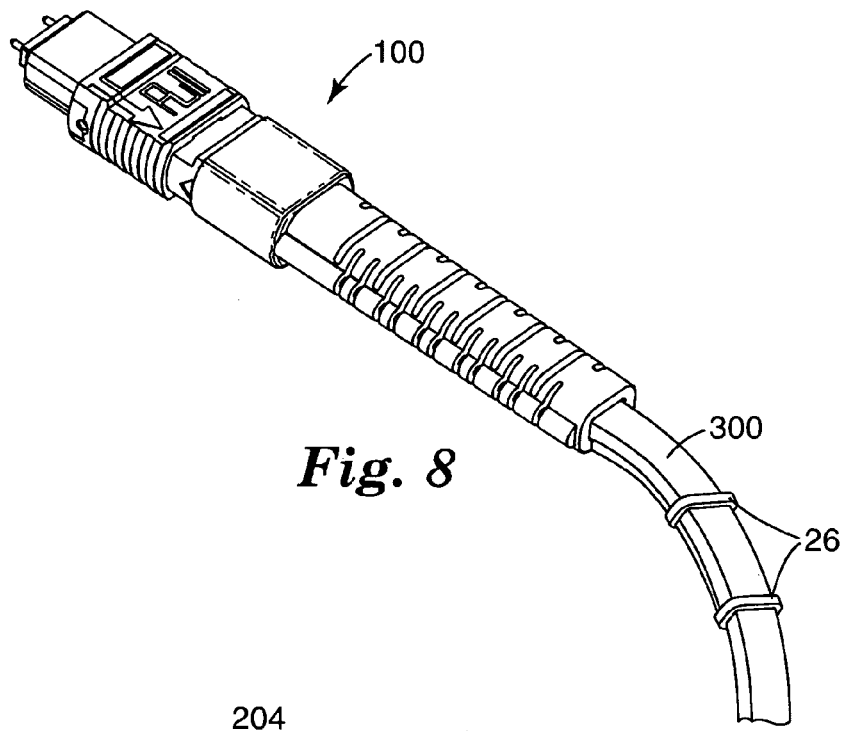
FIG. 8 is a perspective view of one exemplary embodiment of a fiber optic cable assembly in accordance with one aspect of the present invention.

FIG. 7 shows the repositionable strain relief boot of FIG. 2 attached to a terminated connector. FIG. 8 shows the embodiment of FIG. 7 with a connector subassembly to yield fiber optic cable assembly 100. As shown, at least a portion of the fiber optic cable 300 is disposed on the flexible extension and retained by closed loops 26.

What is claimed is:

1. A fiber optic cable assembly comprising:
   (a) a connector subassembly comprising a fiber optic cable terminated in a connector, the fiber optic cable having a minimum bend radius; and
   (b) a strain relief boot attached to the connector subassembly, the strain relief boot comprising a core portion, a flexible extension having a proximal end and a distal end, the proximal end extending from the core portion, and a means for retaining at least a portion of the fiber optic cable which is disposed along the flexible extension;
   wherein the flexible extension does not have a predetermined bend;
   wherein the strain relief boot is repositionable or non-repositionable;
   wherein the repositionable or the non-repositionable strain relief boot further comprises a connector mating end attached to the end of the core portion that is the opposite of the end from which the flexible extension extends; and
   wherein the repositionable strain relief boot has a longitudinal axis along its length and further comprises:
   (c) a plurality of slits in the core portion, the slits disposed generally perpendicular to the longitudinal axis; and
   (d) a rib extending from the core portion, the rib having a wire disposed therein.

2. The fiber optic cable assembly of claim 1, wherein the flexible extension is a tapered beam having a varying cross-sectional area such that the height of the tapered beam at the proximal end is about twice the height of the tapered beam at the distal end.

3. The fiber optic cable assembly of claim 1, wherein the strain relief boot and the flexible extension are formed integrally.

4. The fiber optic cable assembly of claim 1, wherein the flexible extension is a removable member comprising a collar at its proximal end, the collar being attached to the core portion of the strain relief boot.

5. The fiber optic cable assembly of claim 1, wherein the rib is formed integrally with the strain relief boot.

6. The fiber optic cable assembly of claim 1, wherein the wire is molded in place in the rib.

7. The fiber optic cable assembly of claim 1, wherein the means for retaining a fiber optic cable is selected from a group consisting of open loops, closed loops, and combination thereof.

8. The fiber optic cable assembly of claim 7 having two flexible extensions extending from the core portion of the strain relief boot, the flexible extensions disposed parallel to one another.

9. The fiber optic cable assembly of claim 8, wherein the two flexible extensions are connected by at least one closed loop.

10. The fiber optic cable assembly of claim 1, wherein the flexible extension is made from a material selected from a group consisting of polymeric material, a metallic material, or combination thereof.

11. The fiber optic cable assembly of claim 10, wherein the polymeric material is selected from the group consisting of polyurethane and a terpolymer elastomer made from ethylene-propylene diene monomer.

12. The fiber optic cable assembly of claim 10, wherein the polymeric material meets UL-94 V0 rating requirements.

13. The fiber optic cable assembly of claim 1, wherein the core portion of the strain relief boot is tapered.

14. The fiber optic cable assembly of claim 1, wherein the length of the flexible extension is about one third of the total length of the strain relief boot.

15. The fiber optic cable assembly of claim 1, wherein the flexible extension provides stress relief to the fiber optic cable exiting the core portion.

16. The fiber optic cable assembly of claim 1, wherein the flexural characteristic of the flexible extension coincides with the flexural characteristic of the fiber optic cable used.

17. The fiber optic cable assembly of claim 1, wherein when a tensile stress is applied to the fiber optic cable, the flexible extension deflects in substantially a constant radius of curvature in response to that stress.

18. The fiber optic cable assembly of claim 17, wherein the constant radius of curvature at which the flexible extension deflects is not less than the minimum bend radius of the fiber optic cable.

19. The fiber optic cable assembly of claim 1, wherein the fiber optic cable is a single or multifiber cable.

20. A strain relief boot for use with a fiber optic cable having a minimum bend radius, the strain relief boot comprising:
   (a) a core portion; and
   (b) a flexible extension having a proximal end and a distal end, the proximal end extending from the core portion; and
   (c) means for retaining at least a portion of the fiber optic cable which is disposed along the flexible extension, wherein the flexible extension does not have a predetermined bend wherein the flexible extension does not have a predetermined bend;

wherein the strain relief boot is repositionable or non-repositionable;

wherein the repositionable or the non-repositionable strain relief boot further comprises a connector mating end attached to the end of the core portion that is the opposite of the end from which the flexible extension extends; and wherein the repositionable strain relief boot has a longitudinal axis along its length and further comprises:

(d) a plurality of slits in the core portion, the slits disposed generally perpendicular to the longitudinal axis; and (e) a rib extending from the core portion, the rib having a wire disposed therein.

21. The strain relief boot of claim 20, wherein the flexible extension is a tapered beam having a varying cross-sectional area such that the height of the tapered beam at the proximal end is about twice the height of the tapered beam at the distal end.

22. The strain relief boot of claim 20, wherein the strain relief boot and the flexible extension are formed integrally.

23. The strain relief boot of claim 20, wherein the flexible extension is a removable member comprising a collar at its proximal end, the collar being attached to the core portion.

24. The strain relief boot of claim 20, wherein the rib is formed integrally with the strain relief boot.

25. The strain relief boot of claim 20, wherein the wire is molded in place in the rib.

26. The strain relief boot of claim 20, wherein the means for retaining a fiber optic cable is selected from a group consisting of open loops, closed loops, and combination thereof.

27. The strain relief boot of claim 26 having two flexible extensions extending from the core portion, the flexible extensions disposed parallel to one another.

28. The strain relief boot of claim 27, wherein the two flexible extensions are connected by at least one closed loop.

29. The strain relief boot of claim 20, wherein the flexible extension is made from a material selected from a group consisting of polymeric material, a metallic material, or combination thereof.

30. The strain relief boot of claim 29, wherein the polymeric material is selected from the group consisting of polyurethane and a terpolymer elastomer made from ethylene-propylene diene monomer.

31. The strain relief boot of claim 30, wherein the polymeric material meets UL-94 V0 rating requirements.

32. The strain relief boot of claim 20, wherein the flexural characteristic of the flexible extension coincides with the flexural characteristic of the fiber optic cable used.

33. The strain relief boot of claim 20, wherein the core portion is tapered.

34. The strain relief boot of claim 20, wherein the length of the flexible extension is about one third of the total length of the strain relief boot.

35. The strain relief boot of claim 20, wherein the flexible extension provides stress relief to the fiber optic cable exiting the core portion.

36. The strain relief boot of claim 20, wherein when a tensile stress is applied to the fiber optic cable, the flexible extension deflects in substantially a constant radius of curvature in response to that stress.

37. The strain relief boot of claim 36, wherein the constant radius of curvature at which the flexible extension deflects is not less than the minimum bend radius of the fiber optic cable.

* * * * *